United States Patent
Spampinato et al.

(10) Patent No.: US 11,593,949 B2
(45) Date of Patent: *Feb. 28, 2023

(54) METHOD OF DETECTING MOVING OBJECTS VIA A MOVING CAMERA, AND RELATED PROCESSING SYSTEM, DEVICE AND COMPUTER-PROGRAM PRODUCT

(71) Applicant: STMicroelectronics S.r.l., Agrate Brianza (IT)

(72) Inventors: Giuseppe Spampinato, Catania (IT); Salvatore Curti, Catania (IT); Arcangelo Ranieri Bruna, Giardini Naxos (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 34 days.

This patent is subject to a terminal disclaimer.

(21) Appl. No.: 17/220,475

(22) Filed: Apr. 1, 2021

(65) Prior Publication Data
US 2021/0248757 A1    Aug. 12, 2021

Related U.S. Application Data

(63) Continuation of application No. 16/774,625, filed on Jan. 28, 2020, now Pat. No. 10,977,804.

(30) Foreign Application Priority Data

Feb. 8, 2019   (IT) .................. 102019000001833

(51) Int. Cl.
    *G06T 7/223*        (2017.01)
(52) U.S. Cl.
    CPC .... *G06T 7/223* (2017.01); *G06T 2207/10016* (2013.01)

(58) Field of Classification Search
    CPC ........... G06T 7/223; G06T 2207/10016; G06T 7/254; G06T 7/215
    (Continued)

(56) References Cited

U.S. PATENT DOCUMENTS 9,305,362 B1 * 4/2016 Szedo ................ H04N 5/23267
10,140,550 B2   11/2018 Spampinato et al.
(Continued)

FOREIGN PATENT DOCUMENTS

WO    2015044518 A1    4/2015

OTHER PUBLICATIONS

Anandhalli, Mallikarjun "Improvised Approach Using Background Subtraction for Vehicle Detection", IEEE International Advance Computing Conference (IACC), Jun. 12-13, 2015, 7 pages.
(Continued)

*Primary Examiner* — Stephen P Coleman
(74) *Attorney, Agent, or Firm* — Slater Matsil, LLP

(57) ABSTRACT

In accordance with an embodiment, a method of detecting moving objects via a moving camera includes receiving a sequence of images from the moving camera; determining optical flow data from the sequence of images; decomposing the optical flow data into global motion related motion vectors and local object related motion vectors; calculating global motion parameters from the global motion related motion vectors; calculating moto-compensated vectors from the local object related motion vectors and the calculated global motion parameters; compensating the local object related motion vectors using the calculated global motion parameters; and clustering the compensated local object related motion vectors to generate a list of detected moving objects.

24 Claims, 2 Drawing Sheets

(58) Field of Classification Search
USPC .......................................................... 382/107
See application file for complete search history.

(56) References Cited

U.S. PATENT DOCUMENTS

| | | |
|---|---|---|
| 2003/0219146 A1 | 11/2003 | Jepson et al. |
| 2011/0085049 A1 | 4/2011 | Dolgin et al. |
| 2011/0150284 A1* | 6/2011 | Son .......................... G06T 7/246 |
| | | 382/103 |
| 2012/0127270 A1 | 5/2012 | Zhang et al. |
| 2016/0277645 A1 | 9/2016 | Bitouk et al. |

OTHER PUBLICATIONS

Chen, Long et al., "A Coarse-to-Fine Approach for Vehicles Detection From Aerial Images", IEEE International Conference on Computer Vision in Remote Sensing (CVRS), Dec. 16-18, 2012, pp. 221-225.
Cheng, Hsu-Yung, et al., "Vehicle Detection in Aerial Surveillance Using Dynamic Bayesian Networks", IEEE Transactions on Image Processing, vol. 21, Apr. 2012, pp. 2152-2159.
Cheraghi, Seyed Ali et al., "Moving Object Detection Using Image Registration for a Moving Camera Platform", IEEE International Conference on Control System, Computing and Engineering (ICCSCE), Nov. 23-25, 2012, 5 pages.
El Harrouss, Omar et al., "Motion detection based on the combining of the background subtraction and spatial color information", Intelligent Systems and Computer Vision (ISCV), Mar. 25-26, 2015, 5 pages.
Fischler, Martin A., et al., "Random Sample Consensus: A Paradigm for Model Fitting with Applications to Image Analysis and Automated Cartography", Graphics and Image Processing, Communications of the ACM, vol. 24, No. 6, Jun. 1981, pp. 381-395.
Gleason, Joshua et al., "Vehicle Detection From Aerial Imagery", IEEE International Conference on Robotics and Automation, May 9-13, 2011, 6 pages.
Hariyono, Joko et al., "Detection of Pedestrian Crossing Road", IEEE International Conference on Image Processing (ICIP), Sep. 27-30, 2015, 5 pages.
Hartley, R., et al., "Multiple View Geometry in Computer Vision," Cambridge University Press, Second Edition, Mar. 2004, 673 pages.
Huang, Cheng-Ming, et al., "Target Motion Compensation with Optical Flow Clustering During Visual Tracking", IEEE 11th International Conference on Networking, Sensing and Control (ICNSC), Apr. 7-9, 2014, 6 pages.
Huynh-The, Thien et al., "NIC: A Robust Background Extraction Algorithm for Foreground Detection in Dynamic Scenes", IEEE Transactions on Circuits and Systems for Video Technology, vol. 27, Issue 7, Mar. 16, 2016, 14 pages.
Kembhavi, Aniruddha et al., "Vehicle Detection Using Partial Least Squares", IEEE Transactions on Pattern Analysis and Machine Intelligence, vol. 33, No. 6, Jun. 2011, pp. 1250-1265.
Kim, Soo Wan et al., "Detection of moving objects with a moving camera using non-panoramic background model", SpringerLink, Machine Vision and Applications, vol. 24, Issue 5, Jul. 1, 2013, pp. 1015-1028.
Kim, Jiman et al., "Moving Object Detection under Free-moving Camera", Proceedings of IEEE International Conference on Image Processing (ICIP), Sep. 26-29, 2010, 7 pages.
Kim, Jiman et al., "Fast moving object detection with non-stationary background", SpringerLink, Multimedia Tools and Applications, vol. 67, No. 1, Nov. 2013, pp. 311-335.
Liang, Chung-Wei et al., "Moving Object Classification Using a Combination of Static Appearance Features and Spatial and Temporal Entropy Values of Optical Flows", IEEE Transactions on Intelligent Transportation Systems, vol. 16, Issue 6, Dec. 2015, pp. 3453-3464.
Panda, Deepak Kumar et al., "Detection of Moving Objects Using Fuzzy Color Difference Histogram Based Background Subtraction", IEEE Signal Processing Letters, vol. 23, No. 1, Jan. 2016, 5 pages.
Sadeghi-Tehran, Pouria et al., "ATDT: Autonomous Template based Detection and Tracking of Objects from Airborne Camera", Springer, Advances in Intelligent Systems and Computing, vol. 323, Jul. 25, 2014, pp. 555-565.
Sadeghi-Tehran, Pouria et al., "A Real-time Approach for Autonomous Detection and Tracking of Moving Objects from UAV", IEEE Symposium on Evolving and Autonomous Learning Systems (EALS), Dec. 9-12, 2014, 8 pages.
Spampinato, Giuseppe et al., "Fast and Low Power Consumption Outliers Removal for Motion Vector Estimation", Proceedings of the International Conference on Advanced Concepts for Intelligent Vision Systems (ACIVS), Nov. 6, 2015, 12 pages.
Spampinato, Giuseppe et al., "Advanced Low Cost Clustering System", 6th International Conference on Image Processing Theory, Tools and Applications (IPTA), Dec. 12-15, 2016, 5 pages.
Wong, Chup-Chung et al., "Shared-use Motion Vector Algorithm for Moving Objects Detection for Automobiles", IEEE International Conference on Consumer Electronics (ICCE), Jan. 7-11, 2016, 2 pages.
Yi, Kwang Moo et al., "Detection of Moving Objects with Non-Stationary Cameras in 5.8ms: Bringing Motion Detection to Your Mobile Device", Computer Vision and Pattern Recognition Workshops (CVPRW), Jun. 23-28, 2013, 9 pages.
Zheng, Zezhong et al., "Vehicle Detection Based on Morphology From Highway Aerial Images", IEEE International Geoscience and Remote Sensing Symposium (IGARSS), Jul. 22-27, 2012, 5 pages.

* cited by examiner

METHOD OF DETECTING MOVING OBJECTS VIA A MOVING CAMERA, AND RELATED PROCESSING SYSTEM, DEVICE AND COMPUTER-PROGRAM PRODUCT

This application is a continuation of U.S. patent application Ser. No. 16/774,625, filed Jan. 28, 2020, which application claims priority of Italian Patent Application No. 102019000001833, filed on Feb. 8, 2019, which applications are hereby incorporated herein by reference.

TECHNICAL FIELD

Embodiments of the present disclosure relate to techniques for detecting moving objects via a moving camera.

BACKGROUND

Independently moving object (IMO) detection is an important motion perception capability of a mobile observatory system. Since the changes in a scene may be due to the motion of the camera (ego-motion) and the motion of objects there are two possibilities for the dynamic nature of the camera and world setup concerning IMO detection: Stationary camera, moving objects (SCMO) and moving camera, moving objects (MCMO).

In dynamic scene analysis, SCMO scenes have received the most attention. A variety of methods to detect moving objects in static scenes has been proposed. There are in general two types of approaches: region based and boundary based. The most popular and recent region-based approaches is background subtraction, as described, e.g., in: D. K. Panda and S. Meher. Detection of Moving Objects Using Fuzzy Color Difference Histogram Based Background Subtraction. IEEE Signal Processing Letters, 2016; M. Anandhalli and V. P. Baligar. Improvised approach using background subtraction for vehicle detection. IEEE International Advance Computing Conference (IACC), 2015; 0. E. Harrouss, D. Moujahid and H. Tairi. Motion detection based on the combining of the background subtraction and spatial color information. Intelligent Systems and Computer Vision (ISCV), 2015; and T. Huynh-The, O. Banos, S. Lee, B. H. Kang, E. Kim and T. Le-Tien. NIC: A Robust Background Extraction Algorithm for Foreground Detection in Dynamic Scenes. IEEE Transactions on Circuits and Systems for Video Technology, 2016.

Conversely, in boundary-based approaches, many recent approaches use edge based optical flow, as described, e.g., in: C. Huang and M. Hung. Target motion compensation with optical flow clustering during visual tracking. IEEE 11th International Conference on Networking, Sensing and Control (ICNSC), 2014; C. Wong, W. C. Siu, S. Barnes, P. Jennings and B. Fong. Shared-use motion vector algorithm for moving objects detection for automobiles. IEEE International Conference on Consumer Electronics (ICCE), 2016; J. Hariyono and K. Jo. Detection of pedestrian crossing road. IEEE International Conference on Image Processing (ICIP), 2015; and C. Liang and C. Juang. Moving Object Classification Using a Combination of Static Appearance Features and Spatial and Temporal Entropy Values of Optical Flows. IEEE Transactions on Intelligent Transportation Systems, 2015.

Interest for MCMO has been largely increased in computer vision due to the rising demand for mobile platforms, such as Unmanned Aerial Vehicles (UAVs), automatic vehicles and mobile robots.

For example, FIG. 1 shows a typical MCMO situation. Specifically, in the example considered, an unmanned aerial vehicle drone (UAV D) flies with a given velocity VD at a given height over a surface S. The UAV D includes at least one camera for acquiring images of the surface S. For example, in FIG. 1 shows two objects O1 and O2, such as cars, which travel on the surface S with respective velocities v1 and v2.

Thus, as shown in FIG. 2, generally the present application relates to a movable device D comprising a camera 10 providing a sequence of images IMG and a processing unit 30 configured to determine a list of moving objects O in the images IMG. Specifically, the displacement of objects O in the image IMG is derived from two types of movements: the movement of the device D/camera 10 (e.g., vD); and the movement of the moving objects O to be detected (e.g., v1, v2).

MCMO is thus an extremely challenging task in dynamic scene analysis. Due to the difficulty of detecting moving objects with a moving camera 10, since the two types of movement are mixed together, only a handful of methods have been proposed compared to a stationary camera.

One of the key steps in IMO detection in the MCMO case is thus the compensation of the camera induced motion. A variety of methods to compensate for the ego-motion has been proposed. In particular, two main approaches have been proposed: visual feature based and motion based.

Visual feature-based approaches usually consider colors, corners, edges or shapes, as described, e.g., in: C. Hsu-Yung, W. Chih-Chia, and C. Yi-Ying, "Vehicle Detection in Aerial Surveillance Using Dynamic Bayesian Networks", IEEE Transactions on Image Processing, vol. 21, pp. 2152-2159, 2012; C. Long, J. Zhiguo, Y. Junli, and M. Yibing, "A coarse-to-fine approach for vehicles detection from aerial images", International Conference on Computer Vision in Remote Sensing (CVRS), 2012; S. A. Cheraghi and U. U. Sheikh, "Moving object detection using image registration for a moving camera platform", IEEE International Conference on Control System, Computing and Engineering (ICCSCE), 2012; J. Gleason, A. V. Nefian, X. Bouyssounousse, T. Fong, and G. Bebis, "Vehicle detection from aerial imagery", IEEE International Conference on Robotics and Automation, 2011; Z. Zezhong, W. Xiaoting, Z. Guoqing, and J. Ling, "Vehicle detection based on morphology from highway aerial images", IEEE International Geoscience and Remote Sensing Symposium (IGARSS), 2012; A. Kembhavi, D. Harwood, and L. S. Davis, "Vehicle Detection Using Partial Least Squares", IEEE Transactions on Pattern Analysis and Machine Intelligence, vol. 33, pp. 1250-1265, 2011; and P. Sadeghi-Tehran and P. Angelov, "ATDT: Autonomous Template based Detection and Tracking of Objects from Airborne Camera", Proceedings of IEEE International Intelligent Systems, pp 555-565, 2014. However, the inventors have observed that these approaches are not computationally efficient, since image information is needed for the processing.

An alternative method is based on motion analysis. Specifically, different motion based MCMO approaches have been proposed: spatio-temporal background modeling, grid-based modeling and feature clustering, as described, e.g., in: S. W. Kim, K. Yun, K. M. Yi, S. J. Kim and J. Y. Choi, "Detection of moving objects with a moving camera using non-panoramic background model", Machine Vision and Applications, 2012; K. M. Yi, K. Yun, S. W. Kim, H. J. Chang, H. Jeong and J. Y. Choi, "Detection of Moving Objects with Non-stationary Cameras in 5.8 ms: Bringing Motion Detection to Your Mobile Device", Computer Vision and Pattern Recognition Workshops (CVPRW), 2013; and J. Kim, X. Wang, H. Wang, C. Zhu and D. Kim, "Fast moving object detection with non-stationary background", Multimedia tools and applications, vol. 67, no. 1, 2013. The inventors have observed that also these methods are computationally heavy.

Another MCMO method falling in this category is based on Optical Flow (OF) data, which is computationally lighter. Optical flow estimation gives a two-dimensional motion vector (MV), which represents the movement of some points of an image in the following one of the sequence. Essentially, in this approach the optical flow data are used to calculate a background movement model, which is then subtracted from the current frame/image to eliminate global camera movement. In this way, a modified frame/image is determined which comprises only foreground movements, which may be clustered to correctly identify moving objects. For example, in this context may be cited documents such as: P. Sadeghi-Tehran, C. Clarke, P. Angelov, "A real-time approach for autonomous detection and tracking of moving objects from UAV", IEEE Symposium on Evolving and Autonomous Learning Systems (EALS), 2014; and J. Kim, G. Ye and D. Kim, "Moving object detection under free-moving camera", Proceedings of IEEE International Conference on Image Processing (ICIP), 2010.

SUMMARY

In accordance with an embodiment, a method of detecting a moving object via a moving camera includes receiving a sequence of images from the moving camera; generating a set of optical flow data from the sequence of images, the set of optical flow data comprising motion vectors associated with respective features in the sequence of images; determining a global motion model as a function of motion vectors in the set of optical flow data, and, based on the determined global motion model, dividing the motion vectors in the set of optical flow data into: an inlier set comprising motion vectors related to global motion, and an outlier set comprising motion vectors related to local object motion; determining refined parameters of the global motion model as a function of the motion vectors in the inlier set; receiving a boundary box list determined for a previous image in the sequence of images, the boundary box list comprising a list of boundary boxes, each boundary box defining a position and dimension of a respective moving object in the previous image; generating a temporally filtered set of optical flow data by determining which motion vectors in the set of optical flow data have a position within at least one of the boundary boxes, and including the determined motion vectors are in the temporally filtered set of optical flow data; calculating for each motion vector in the temporally filtered set of optical flow data, a respective first moto-compensated vector as a function of the refined parameters of the global motion model; and grouping the respective first moto-compensated vectors as a function of a position, a length and/or an orientation of the respective first moto-compensated vectors, and determining a boundary box list for a current image by determining a respective boundary box for each group of the respective first moto-compensated vectors. In accordance with another embodiment, a system comprises a camera; and a processor coupled to the camera, the processor configured to: determine optical flow data from a sequence of images provided by the camera, decompose the optical flow data into global motion related motion vectors and local object related motion vectors, calculate global motion parameters from the global motion related motion vectors, calculate moto-compensated vectors from the local object related motion vectors and the calculated global motion parameters, compensate the local object related motion vectors using the calculated global motion parameters, and cluster the compensated local object related motion vectors to generate a list of detected moving objects.

In accordance with a further embodiment, An image signal processor includes a hardware image processing core configured to perform optical flow analysis; and a processor programmed to perform the following steps: cause the hardware image processing core to determine optical flow data from a sequence of images; using a RANSAC algorithm, produce a global motion model and an outlier set of motion vectors related to local object motion of the sequence of images; motion compensating the outlier set of motion vectors based on the global motion model to produce compensated motion vectors; and determining a list of moving objects from the compensated motion vectors.

In accordance with a further embodiment, a method of detecting moving objects via a moving camera includes receiving a sequence of images from the moving camera; determining optical flow data from the sequence of images; decomposing the optical flow data into global motion related motion vectors and local object related motion vectors; calculating global motion parameters from the global motion related motion vectors; calculating moto-compensated vectors from the local object related motion vectors and the calculated global motion parameters; compensating the local object related motion vectors using the calculated global motion parameters; and clustering the compensated local object related motion vectors to generate a list of detected moving objects.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

Figure 1:
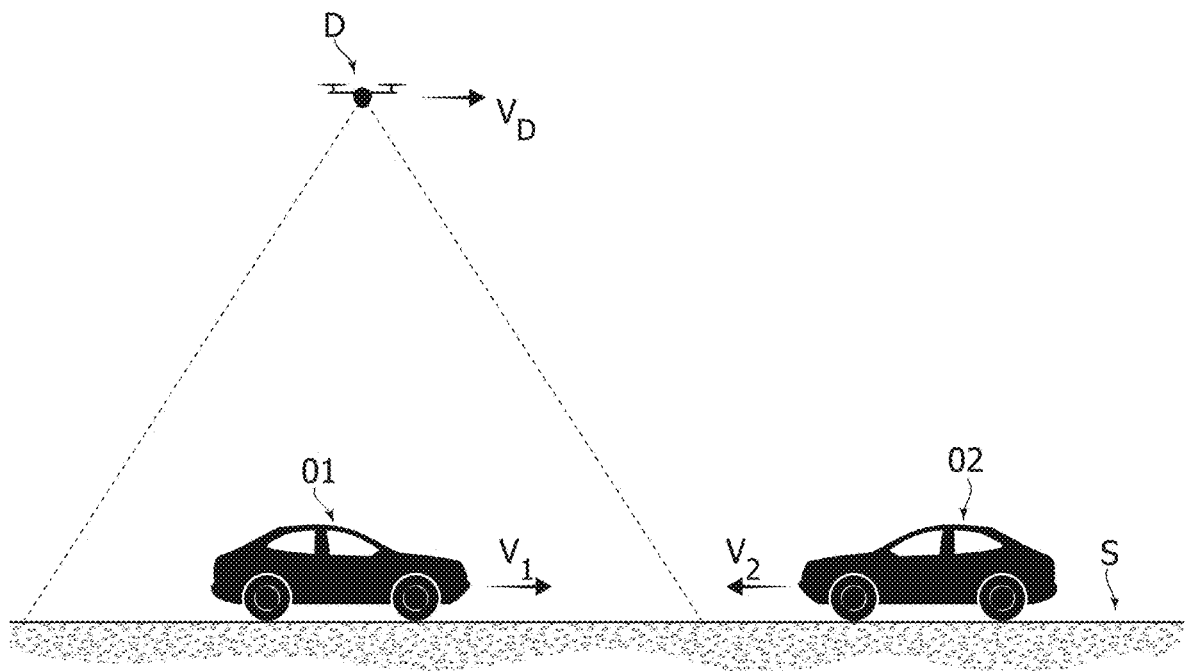
FIG. 1 shows a typical scenario wherein one or more moving objects have to be detected in an image provided by a moving camera.

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Various embodiments of the present disclosure are directed to detecting moving objects via a moving camera. Some embodiments are configured to determine moving objects, without any assumption about the camera motion and the environmental conditions. Advantageously, some embodiment motion detection systems and methods have a low-complexity and are executable in real-time.

One or more embodiments of the present disclosure are directed to a method of detecting moving objects via a moving camera. Some embodiments are directed to a related processing system, and device, as well as a computer-program product, loadable into the memory of at least one processor and comprising portions of software code capable of implementing the steps of the method when the product is run on at least one processor. Thus, as used herein, reference to such a computer-program product is understood to be equivalent to a reference to a non-transitory computer-readable medium containing instructions for controlling the processing system for coordinating implementation of the method according to the invention. The reference to "at least one processor" is evidently intended to highlight the possibility that the present invention is implemented in a modular form and/or distributed.

As mentioned before, various embodiments of the present disclosure relate to a method and related system for detecting one or more moving objects via a moving camera. Specifically, in various embodiments, the detection is based on optical flow data. In various embodiments, the system receives thus a sequence of images from the moving camera and the system processes the sequence of images in order to generate a set of optical flow data comprising a list of motion vectors being associated with respective features in the sequence of images. Generally, the motion vectors may thus relate to the movement of the background due to the camera movement or the movement of objects in the scene, i.e. a movement of the objects with respect to the background.

In various embodiments, the system, e.g. by executing a Random Sample Consensus, RANSAC, determines parameters of a global motion model as a function of the motion vectors in the set of optical flow data. Specifically, in various embodiments, the parameters of the global motion model may comprise a horizontal movement, a vertical movement, a rotation and a zoom of the background image due to the movement of the camera.

In various embodiments, once having selected a given global motion model the system may then divide the motion vectors in the set of optical flow data into an inlier set comprising the motion vectors to which the global motion model applies, and an outlier set comprising the motion vectors to which the global motion model does not apply. In various embodiments, the system determines then refined parameters of the global motion model (exclusively) as a function of the motion vectors in the inlier set.

Conversely, the outlier set is processed in order to identify moving objects in the scene. Specifically, in various embodiments, the objects are identified via a boundary box list comprising a list of boundary boxes, each boundary box defining the position and dimension of a respective moving object in the previous image.

In various embodiments, the system may also take into account the boundary box list determined for a previous image, i.e. the system may receive a boundary box list determined for a previous image in the sequence of images. For example, in various embodiments, the system generates a temporally filtered set of optical flow data by determining the motion vectors in the set of optical flow data having a position within at least one of the boundary boxes, and ensuring that the determined motion vectors are included in the outlier set. In various embodiments, before performing the temporal filtering, the system may calculate for each motion vector in the outlier set a respective moto-compensated vector as a function of the refined parameters, and determine a refined set of optical flow data by removing motion vectors from the outlier set which are similar to the respective moto-compensated vector, thereby removing motion vectors which likely should belong to the inlier set. Thus, the temporally filtered set of optical flow data may be generated by ensuring that the determined motion vectors are included in the refined set of optical flow data.

In various embodiments, the system may thus calculate for each motion vector in the temporally filtered set of optical flow data a respective moto-compensated vector as a function of the refined parameters. Next, the system may group the moto-compensated vectors as a function of their position and their length and/or orientation, and determine the boundary box list for the current image by determining for each group of motion vectors a respective boundary box.

In various embodiments, the system may also pre-process the motion vectors in the set of optical flow data and/or post-process the moto-compensated vectors, wherein the pre-processing and/or post-processing may comprise removing out-of-range motion vectors, removing out-of-frame motion vectors, and/or eliminating noisy motion vectors.

In various embodiments, the system may also verify whether the temporally filtered set of optical flow likely contains no data related to real object movements. For example, in various embodiments, the system may determine the area occupied by the motion vectors in the set of (original) optical flow data and the area occupied by the motion vectors in the temporally filtered set of optical flow data. In fact, when these areas have substantially the same dimension, the temporally filtered set of optical flow likely contains only motion vectors related to the background movement. Accordingly, the system may set the boundary box list to empty when the area occupied by the motion vectors in the temporally filtered set of optical flow data is greater than a given percentage of the area occupied by the motion vectors in the set of optical flow data. Additionally or alternatively, the system may determine the number of motion vectors in the set of optical flow data and the number of motion vectors in the temporally filtered set of optical flow data. In fact, when these numbers are similar, the temporally filtered set of optical flow likely contains mainly motion vectors related to the background movement. Accordingly, the system may set the boundary box list to empty when the number motion vectors in the temporally filtered set of optical flow data is greater than a given percentage of the number of motion vectors in the set of optical flow data.

Figure 2:
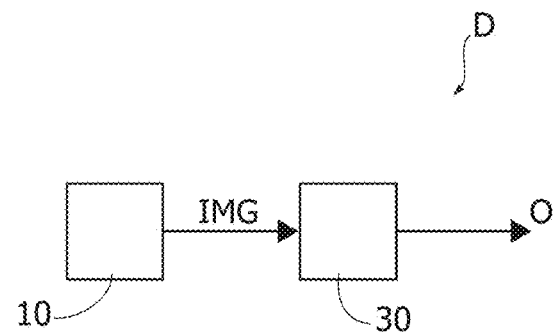
FIG. 2 shows an example of a device configured to determine one or more moving objects in an image provided by a moving camera.

In the following FIGS. 3 to 5 parts, elements or components which have already been described with reference to FIGS. 1 to 2 are denoted by the same references previously used in such Figures; the description of such previously described elements will not be repeated in the following in order not to overburden the present detailed description.

As mentioned in the foregoing, various embodiments of the present disclosure relate to detecting moving objects O by means of a moving camera 10. Specifically, in various embodiments, the images IMG provided by the one or more cameras 10 are elaborated to extract motion vectors, i.e. the system may determine moving objects (i.e. objects moving with respect to the (moving) background of the image IMG, e.g. the surface S shown in FIG. 1) exclusively based on the motion vectors extracted from the scene.

Figure 3:
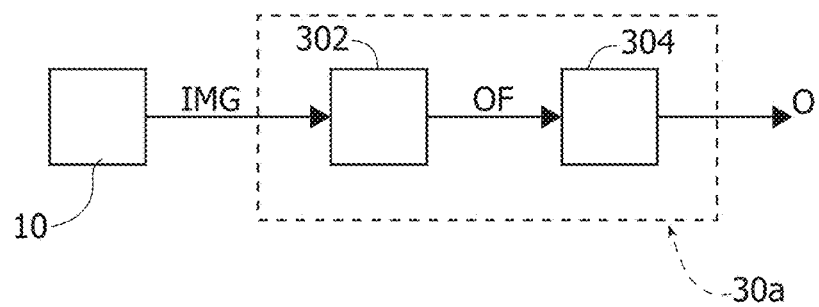
FIG. 3 shows an embodiment of a device configured to determine one or more moving objects based on optical flow data determined as a function of a sequence of images provided by a moving camera.

FIG. 3 shows an embodiment of a system configured to detect one or more moving objects O.

As mentioned in the forgoing, such a system comprises at least one camera 10 suitable to be fixed to a moving device D, such as a UAV, a vehicle, etc. Accordingly, in use, the camera 10 will provide a sequence of images/frames IMG, i.e. a video stream, showing a scene. For example, in various embodiments, the camera 10 may be a STMicroelectronics VG6640 image sensor having 1.3 megapixels.

In the embodiment considered, the system comprises also a processing system 30a configured to receive the sequence of images IMG and elaborate the images IMG in order to detect moving objects O.

As mentioned before, in various embodiments, the processing system 30a generates the list of moving objects O only based on the images IMG and no further sensors are used. However, in general, the embodiment methods disclosed herein may also be combined with other data in order to improve the detection, such as data providing position and/or movement information of the device D.

For example, in various embodiments, the processing system 30a may be implemented with an Image Signal Processor (ISP), such as a STMicroelectronics STV0991 processor. For example, this image processor has not only a classic pipeline for image reconstruction from a Bayer image, but includes already hardware image processing cores, e.g. for embedded video analysis, including Optical Flow (OF) and edge data extraction. More specifically, this processor comprises an embedded ARM CPU, thereby permitting the execution of additional software code for implementing the complete processing system 30a within a single image signal processor.

In various embodiments, the processing system 30a comprises two sub-modules.

The first module 302 is configured to analyses the images IMG provided by the camera 10 in order to generate optical flow data OF. For example, in various embodiments, the data OF include a collection/list of Motion Vectors (MV) indicating the motion of respective features in the current image/frame compared with the previous image/frame. As mentioned before, in various embodiments, the optical flow data OF are computed in hardware, thereby permitting a real time processing with, e.g., 30 fps. Generally, the computation of optical flow data OF, in particular of motion vectors, is well known in the art, rendering a more detailed description herein unnecessary.

A second module 304 receives the optical flow data OF from the module 302 and elaborates the data OF. For example, the module 302 may store the data OF in a memory, such as a dual-port RAM, and the module 304 may access the same memory locations in order to read the data OF. For example, typically, such Motion Vectors comprise bi-dimensional position data of the feature (e.g. in terms of pixel coordinates in the current image or the previous image) and bi-dimensional displacement data (e.g. in terms of pixel coordinates indicating the difference between the position of the respective feature in the current image and the previous image).

Specifically, the module 304 is configured to elaborate the optical flow data OF in order to determine the list of moving objects O. In various embodiments, the module 304 is a software module, e.g. executed by means of the processor, e.g. the processor comprising also the (hardware) module 302.

Figure 4:
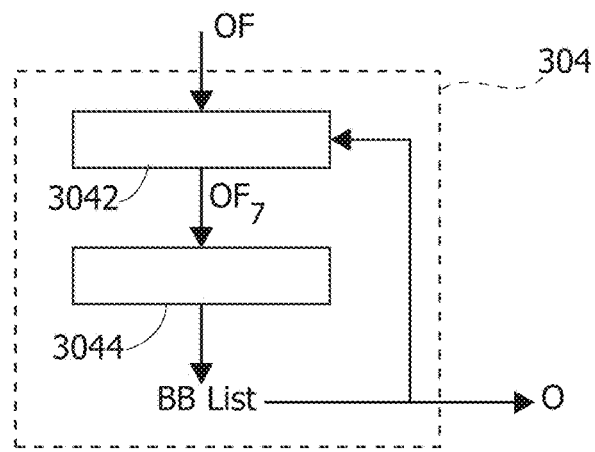
FIGS. 4 and 5 show details of the operation of the device of FIG. 3.

An embodiment of the operation of the module 304 is shown in FIG. 4.

Substantially, in the embodiment considered, the optical flow data OF, i.e. the motion vectors, are filtered at a step 3042. Specifically, the step 3042 is used to perform a Global Motion Vector Removal (GMVR) to eliminate global background motion. Accordingly, the step 3042 provides a reduced optical flow set OF7. The obtained optical flow set OF7, i.e. the optical flow data containing only the object movement MVs, is then used at a clustering step 3044 to obtain a moving object Bounding Box (BB) List BB List for this frame, which essentially comprises the list of moving objects O in the current frame/image IMG. In various embodiments, the BB List may also be used at the step 3042 for the next frame for preserving it, thereby avoiding to "lose" moving objects previously identified.

Figure 5:
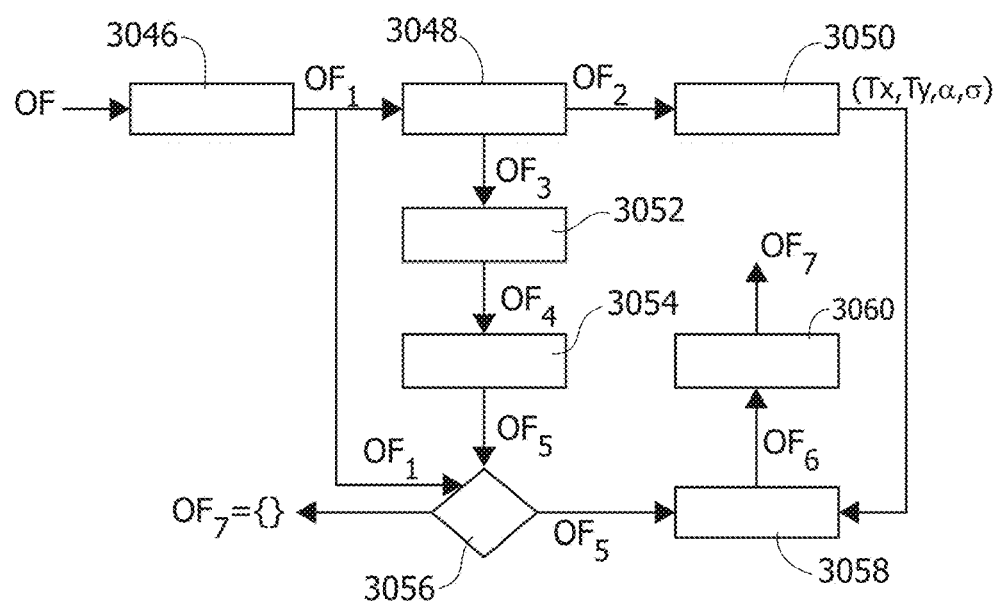

FIG. 5 shows an embodiment of the filtering step 3042.

As mentioned before, the step 3042 receives at input the optical flow data OF determined by the hardware and/or software sub-module 302. Generally, these optical flow data derive from a combination of the movement of the camera 10 and the movement of the objects O in the scene.

In the embodiment considered, the optical flow data OF are first filtered by a pre-filtering step 3046. This step is purely optional, but may be useful in order to eliminate noisy and/or out-of-range motion vectors.

An optimized Random Sample Consensus (RANSAC) is then applied at a step 3048 to the filtered optical flow data OF1 provided by the pre-filtering step 3046 (or directly the original optical flow data OF). Specifically, the step provides two subsets of optical flow data:
  an inlier set OF2, which should contain motion vectors related to global camera motion; and
  an outlier set OF3, which should contain motion vectors related to local objects motion.

In various embodiments, these two sets of optical flow data OF2 and OF3 are then processed independently.

Specifically, the inlier set OF2 is elaborated at a step 3050 to recalculate the parameters of the global motion model of the camera 10, in particular with respect to a horizontal movement Tx and a vertical movement Ty of the background image due to the movement of the camera, and optionally a rotation α and/or a zoom σ of the background image due to the movement of the camera.

Conversely, the outlier set OF3 is adjusted by a refinement filtering step 3052, which depending on distance metrics obtains a modified outlier set OF4.

In various embodiments, the modified outlier set OF4 is then provided to a temporal clustering step 3054, which may use the above described BB List in order to avoid that already identified objects are eliminated, i.e., the step 3054 may reintroduce motion vectors in the filtered outlier set OF4, thereby generating a filtered outlier set OF5.

In various embodiments, the optical flow data OF4 or OF5 are then provided to a verification step 3056. Substantially, depending on MVs occupied area, the verification step 3056 is used to determine whether the optical flow data OF4 or OF5 (when also using the temporal filtering step 3054) can really contain motion vectors related to local objects motion. For example, if the verification indicates that certain conditions are not meet (as will be described in greater detail in the following), the optical flow data OF4/OF5 are discarded and the final output OF7 is empty, i.e. no moving objects O are identified in the BB list for the current frame. Otherwise, in various embodiments, a vector compensation is applied at a step 3058 to the optical flow data OF4/OF5, thereby obtaining a compensated outlier set OF6.

In various embodiments, an optional post-filtering step 3060 may be applied to the compensated outlier set provided by the step 3058. Thus, in this case, the output optical flow data OF7 may correspond to the compensated outlier set OF6 or the post-filtered optical flow data.

In the following will be described possible embodiments of the various steps.

As mentioned before, in various embodiments, the optical flow data OF generated by the sub-module 302 are provided to a pre-filtering step 3046.

Specifically, in various embodiments, the processing unit 30*a* is configured to generate at the pre-filtering step 3046 a reduced optical flow set OF1 by comparing each motion vector of the optical flow set OF with one or more conditions.

For example, in various embodiments, each motion vector comprises position data in the form of absolute pixel coordinates P=(X, Y) where X corresponds to the pixel position in a horizontal direction of the previous image IMG and Y corresponds to the pixel position in a vertical direction of the previous image IMG, and displacement data in the form of a velocity/displacement vector v=(dX, dY) where dX corresponds to the displacement of pixels in the horizontal direction of the current image IMG with respect to the previous image IMG and dY corresponds to the displacement of pixels in the vertical direction of the current image IMG with respect to the previous image IMG.

For example, in various embodiments, the processing unit 30*a* may verify at the step 3046 whether the displacement data exceed a maximum value indicative of a maximum object movement, e.g.:

$$\text{ABS}(dX) > \text{SEARCH\_WIDTH} \quad (1)$$

$$\text{ABS}(dY) > \text{SEARCH\_HEIGHT} \quad (2)$$

where the function ABS provides the absolute value, and the parameters SEARCH_WIDTH and SEARCH_HEIGHT represent respective maximum values. Generally, these parameters may be fixed or programmable.

In various embodiments, the processing unit 30*a* may verify at the step 3046 whether the resulting position of the feature in the current image IMG, i.e. (X+dX, Y+dY), is within the boundaries of the image IMG. For example, assuming that the horizontal position X should be in a range between 0 and IMAGE_WIDTH−1, and the vertical position Y should be in a range between 0 and IMAGE_HEIGHT−1, the processing unit 30*a* may verify:

$$(X+dX) < 0 \quad (3)$$

$$(Y+dY) < 0 \quad (4)$$

$$(X+dX) \geq \text{IMAGE\_WIDTH} \quad (5)$$

$$(Y+dY) \geq \text{IMAGE\_HEIGHT} \quad (6)$$

In various embodiments, the processing unit 30*a* may verify at the step 3046 whether the motion vector results from noise, which is usually the case for motion vectors having a rather small displacement. For example, in various embodiment, the processing unit may verify:

$$(\text{ABS}(dX) + \text{ABS}(dY)) \leq \text{MAX\_N} \quad (7)$$

where the parameter MAX_N represents a minimum requested displacement. Generally, this parameter may be fixed or programmable. For example, typically MAX_N may be in a range between 1 and 5, e.g. 1.

Accordingly, equations (1) and (2) are used to remove out-of-range motion vectors, equations (3) to (6) are used to remove out-of-frame motion vectors, and equation (7) eliminates noisy motion vectors. Thus, in the embodiment considered, the respective motion vector is removed when at least one of the above conditions is satisfied.

Generally, the pre-processing step 3046 is optional, because the same or substantially similar operations may already be performed by the sub-module 302.

In various embodiments, the pre-filtered optical flow data OF1 (or directly the optical flow data OF) are then processed at the step 3048, e.g. via a Random Sample Consensus (RANSAC). RANSAC is used to divide an optical flow data set (OF1 or OF) into two subsets of optical flow data OF2 and OF3, which contain respectively inliers and outliers MVs. RANSAC is per se known, e.g. from M. A. Fischler and R. C. Bolles, "Random Sample Consensus: A Paradigm for Model Fitting with Applications to Image Analysis and Automated Cartography", Comm. of the ACM, vol. 24, n. 11, pp. 381-395, 1981, which is incorporated herein by reference for this purpose. Substantially, RANSAC randomly samples corresponding matches and tries to fit them by calculating an error between the rest of the samples and the model. It produces a reasonable result only with a certain probability, with this probability increasing as more iterations are allowed. In this way the best consensus set (e.g. the inlier set) is obtained.

For example, in various embodiments, RANSAC is used to estimate a model of the movement of the global movement being a function of a horizontal movement Tx, e.g. in terms of a horizontal pixel displacement, and a vertical movement Ty, e.g. in terms of a vertical pixel displacement. In various embodiments, the model may also include a rotation α, e.g. an angle with respect to the horizontal direction/axis of the image, and a zoom σ.

Thus, in general, also other optimization methods may be used to estimate theses parameters of the global motion model as a function of the optical flow data OF/OF1. However, the inventors have observed that Random Sample Consensus is very robust and able to estimate parameters of a mathematical model from a set of observed data which contain outliers. For example, when using RANSAC, a number of motion vectors are selected at random and used to calculate the parameters of the model of the movement (Tx, Ty, α, σ). The determined model may then be tested against all motion vectors in order to determine the number S of samples (motion vectors) for which the model applies. If the number S does not (yet) reach a given threshold N and a given maximum number of cycles is not yet reached, a new set of motion vectors may be selected at random and used to construct a new model. Conversely, if the number S reaches the threshold N, it is selected as model for the global motion. When the maximum number of cycles is reached the last global motion model or alternatively the best matching global motion model (e.g. the model with the highest number 5) may be selected.

In various embodiments, the value N, essentially representing a minimum number of sample/motion vectors to which the global motion model has to apply, may be determined as a function of the set OF1.

For example, the inventors have observed that the method described at pages 117-119 of document Hartley R., Zisserman A., "Multiple View Geometry in Computer Vision", Cambridge University Press, Second Edition, 2004, may also be applied to the problem of motion vectors. Specifically, this document refers to a method for choosing a distance threshold t, such that with a probability α a point/sample (a motion vector in the present case) is an inlier. Substantially, for each point/motion vector is calculated a distance metric $d_\perp^2$ indicative of the distance from the model, and a sample (motion vector in the present case) belongs to the inlier set when the distance metric $d_\perp^2$ is smaller than $t^2$ (see e.g. equation 4-17 of the cited document. Conversely, equation 4.18 of the cited document shows how to calculate the number N.

Thus, once having obtained the model of movement of the majority of motion vectors, i.e. those expectably deriving from the global movement of the camera/background, the motion vectors may be grouped at the step 3048 into two subsets of optical flow data:

an inlier set OF2 (i.e., the set of motion vectors to which the global motion model applies), which should contain motion vectors related to global camera motion; and an outlier set OF3 (i.e., the set of motion vectors to which the global motion model applies), which should contain motion vectors related to local objects motion.

Thus, the motion vectors in the inlier set OF2 may be used at the step 3050 to calculate refined parameters (Tx, Ty, α, σ) of the global motion model. In this respect may be cited the article G. Spampinato, A. Bruna, G. M. Farinella, S. Battiato and G. Puglisi, "Fast and Low Power Consumption Outliers Removal for Motion Vector Estimation", Proceedings of the International Conference on Advanced Concepts for Intelligent Vision Systems (ACIVS), 2015, which discloses how the parameters (Tx, Ty, α, σ) of the global motion model may be determined for a set of motion vectors from which the outliers have been removed and which is incorporated herein by reference for this purpose. This step essentially corresponds to the calculation of the parameters of the global movement model at the step 3048, but this time are used only the motion vectors in the set OF2, instead of randomly selected motion vectors in the set OF1, thereby improving the precision of the parameters of the global movement model.

Conversely, the outlier optical flow set OF3 is provided to the step 3052 to obtain a reduced outlier optical flow set OF4. In particular, a moto-compensated vector MV' is calculated for each motion vector MV in the set OF3. Specifically, the moto-compensated vector MV' is obtained by applying to the respective motion vector MV the global motion parameters (Tx, Ty, α, σ).

In various embodiments, the motion vector MV is discarded (removed from the set OF3) when both the following two conditions are satisfied:

$$SAD(MV,MV') < TRESHMV \qquad (8)$$

$$ABS(\beta(MV)-\beta(MV')) < TRESH\beta \qquad (9)$$

where the function SAD indicates the Sum of Absolute Difference, the function 13 provides the orientation of the respective motion vector MV/MV' (e.g. with respect to the horizontal direction/axis of the image), and the parameters TRESHMV and TRESHβ correspond to respective thresholds, which may be fixed or programmable. Substantially, equations (8) and (9) permit to remove motion vectors still relating to background/global movement.

In various embodiments, the parameters TRESHMV and TRESHβ are calculated as percentage of the difference between maximum and minimum orientation lying around the considered MV. For example, considering a given couple of motion vectors MV/MV', a given window (e.g., 3×3, 5×3, 3×5, 5×5, etc.) centered in the position of the motion vector MV may be selected. Based on the motion vectors included in this window (except for the motion vector MV), the processing unit 30a may calculate respective moto-compensate motion vectors MV'''. Next the processing unit may determine the maximum and minimum distance of the motion vectors MV''' with respect to the motion vector MV' and determine the threshold TRESHMV as a given percentage of the difference between maximum and minimum distances. Similarly, the processing unit 30a may determine the maximum and minimum angle of the motion vectors MV''' with respect to the motion vector MV and determine the threshold TRESHβ as a given percentage of the difference between the maximum and minimum angle.

In various embodiments, the modified outlier set OF4 generated at the step 3052 is then provided to the temporal clustering step 3054.

Substantially, the step 3054 takes as input the outlier refined optical flow set OF4 and the list of objects O already identified for the previous frame to obtain a new outlier optical flow set OF5. Specifically, in various embodiments (as will be described in greater detail in the following), each object is identified via a boundary box (BB), such as a rectangle having a given position and dimension, e.g. expresses in horizontal and vertical pixels. Thus, in various embodiments, the objects may be identified by a boundary box list "BB List".

In various embodiments, the processing unit 30a may thus preserve at the step 3054 all motion vectors MV (or the respective motion-compensated vectors MV') of the optical flow set OF1 (with OF1=OF when the pre-processing step 3046 is omitted) which are inside of one of the boundary boxes determined for the previous frame. For example, this may be useful to avoid eliminating true object clusters.

The inventors have observed that the step 3054 is rather useful with respect to motion vectors of clusters/objects exiting the scene. In fact, these motion vectors may easily be confused with motion vectors to be eliminated due to camera movement. The step 3054 overcomes this problem by assuming that objects exiting the scene have been previously identified and stored to the BB List.

Once a final adjusted optical flow data OF5 are obtained, the verification step 3056 is used to determine whether to accept of refuse this set OF5. Substantially, the step 3056 verifies whether the set OF5 likely contains just motion vectors resulting from a global movement and thus not related to moving objects.

For example, the inventors have observed that motion vectors of global movement/background are more scattered than those of moving objects, i.e. the respective background area is bigger than the area of moving objects. For example, in various embodiments, the processing unit 30a may preserve the set OF5 only when the following four conditions are satisfied:

$$card(OF5)/card(OF1) < TH1 \qquad (10)$$

$$LengthX(OF5)/LengthX(OF1) < TH2 \qquad (11)$$

$$LengthY(OF5)/LengthY(OF1) < TH3 \qquad (12)$$

$$Area(OF5)/Area(OF1) < TH4 \qquad (13)$$

with:

$$Area(OF) = LengthX(OF)*LengthY(OF) \qquad (14)$$

where card(OF) is the cardinality of the respective set OF, i.e. the number of elements/motion vectors of the respective optical flow set OF, LengthX(OF) and LengthY(OF) are the horizontal and vertical lengths, respectively, occupied by the motion vectors in the respective set OF, i.e. for a set of optical flow data OF comprising motion vectors having respective positions P(x,y), the function LengthX(OF) provides the difference between the maximum horizontal position and the minimum horizontal position of the motion vectors in the respective set OF, and the function LengthY (OF) provides the difference between the maximum vertical position and the minimum vertical position of the motion vectors in the respective set OF.

Once a final adjusted optical flow set OF5 passed the verification step 3056, the parameters (Tx, Ty, α, σ), obtained at the step 3050 are applied to the motion vectors in the set OF5, thereby obtaining the a set OF6 of moto-compensated motion vectors MV'. Generally, moto-compensated motion vectors MV' may already be calculated at the step 3052. However, on the one hand the step 3052 may be optional and on the other hand additional motion vectors may be added again by the step 3054. Thus, in various embodiments, the processing unit 30a may calculate calculated at the step 3058 moto-compensated vectors MV' for all motion vectors or only for the motion vectors reintroduced at the step 3054.

Generally, in order to simplify the calculation, in various embodiments, the step 3058 may assume that all objects have the same distance from the camera, thus simply applying the parameters (Tx, Ty, α, σ) to each motion vector in the set OF5.

In various embodiments, a post-filtering step 3060 may then be applied to the moto-compensated vectors MV' in the set OF6 provided by the step 3058. For example, in various embodiments, the step 3060 may be used to remove noisy and out-of-range motion vectors. Thus, in various embodiments the same operations may be performed as at the step 3046, using as input the moto-compensate vectors MV'.

The final set OF7 of moto-compensated vectors is then provided to the clustering step 3044. Specifically, the processing unit 30a is configured to obtain at the step 3044 from the optical flow set OF7 the BB List, which contains the identified moving objects. Substantially, clustering refers to grouping a set of information in such a way that information in the same group (called a cluster) are more similar to each other than to those in other groups. For example, in the present application moving objects should be identified in the scene by using only optical flow data OF7.

For example, motion vectors MV' apparently belong to the same object if they:

a) are spatially near;
b) have a similar velocity, i.e. a similar length; and
c) have a similar orientation.

For example, in various embodiments, two motion vectors MV1 and MV2 at vector positions P1 and P2 and with vector velocities v1 and v2 are considered spatially near if:

$$SAD(P1, P2) < MPD \qquad (15)$$

where MPD represents a given threshold, e.g. chosen depending on camera resolution and precision of optical flow data.

Similarly, in various embodiments, two motion vectors MV1 and MV2 are considered to have similar velocity if:

$$SAD(v1, v2) < MVD \qquad (16)$$

where MVD represents a given threshold chosen again as a function of the camera resolution and the precision of optical flow data.

Finally, in various embodiments, two motion vectors MV1 and MV2 are considered to have a similar orientation if $$ABS(\beta(V1) - \beta(v2)) < M\beta \qquad (17)$$

where Mβ represents a given threshold.

In various embodiments, the step 3044 assigns the motion vectors MV' to different clusters/objects O based at least two of the above conditions a) to c). For example, in various embodiments, the step 3044 assigns the motion vectors to different clusters/objects O based on conditions a) and b), and preferably also on condition c).

For example, in various embodiments, the step or block 3044 may use the clustering method described in Italian patent application IT102015000082886 or G. Spampinato, A. Bruna, S. Curti, and V. D'Alto, "Advanced Low Cost Clustering System", 6th International Conference on Image Processing Theory, Tools and Applications (IPTA), 2016, which are incorporated herein by reference.

Thus, once having identified similar motion vectors, the processing unit 30a may determine at the step 3044 an area, e.g. in the form of a rectangle, enclosing the respective motion vectors, which represents the boundary box associated with a given object. Finally, the obtained boundary boxes may be stored to the BB List, which identifies thus moving objects in the scene.

Thus, in one or more of the previous embodiments, the optional pre-filtering and/or post-filtering steps 3046 and 3060 are used to remove out-of-range, out-of-frame and/or noisy motion vectors (in the set OF) or motion-compensated vectors (in the set OF6). The RANSAC step 3048 is used to obtain a "best" consensus motion vector set (corresponding to the inlier set OF2) and the remaining motion vectors may be considered as outliers (corresponding to the outlier set OF3). The inlier set OF2 is used at the step 3050 to estimate a global motion model, which may comprise parameters related to shift/displacement (Tx, Ty), rotation (α), and zoom (σ). Conversely, a refinement filter may optionally be applied at the step 3052 to the outlier set OF3, which permits to remove/discard motion vectors which are similar to the respective moto-compensated vector. In various embodiments, a temporal filtering may be performed at the step 3054 in order to preserve/reintroduce motion vectors inside previous calculated boundary boxes. The verification step 3056 permits to verifying whether the remaining motion vectors presumably do not relate to moving objects, e.g. because the remaining motion vectors are few and/or their area is small. In various embodiments, the parameters of the global movement may be applied at a step 3058 to the remaining motion vectors, thereby obtaining the final moto-compensated set, which may be used to identify moving objects via a clustering step 3044, wherein with each moving object may be associated a respective boundary box.

Embodiment motion detection systems and methods have been tested with different scenarios and different cameras at different resolutions, with both linear and fish-eye lens, obtaining good results in terms of moving object identification. The tests show that some embodiments of the present invention advantageously provide a very reliable, computationally efficient, and low-cost IMO detection system for MCMO, which makes use of only optical flow data of two consecutive frames. Due to its simplicity, embodiments of the present invention may be used also for low power applications. Moreover, the proposed system is very flexible and may be used, e.g. with other methods for motion estimation at the module 302 or clustering at the step 3044.

Advantages of embodiments include the ability to detect independently moving objects in the context of a moving camera moving object (MCMO) environment in a computationally efficient manner.

Of course, without prejudice to the principle of the invention, the details of construction and the embodiments may vary widely with respect to what has been described and illustrated herein purely by way of example, without thereby departing from the scope of the present invention, as defined by the ensuing claims. For example, instead of using a SAD in the above equations, also other distance metrics may be used, such as the Euclidean distance, etc.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of detecting a moving object, the method comprising:
    generating a set of flow data from a sequence of images generated by a moving image sensor, the set of flow data comprising motion vectors associated with respective features in the sequence of images;
    determining a global motion model as a function of motion vectors in the set of flow data, and, based on the determined global motion model, dividing the motion vectors in the set of flow data into:
        an inlier set comprising motion vectors related to global motion, and
        an outlier set comprising motion vectors related to local object motion;
    determining refined parameters of the global motion model as a function of the motion vectors in the inlier set;
    receiving a boundary box list determined for a previous image in the sequence of images, the boundary box list comprising a list of boundary boxes, each boundary box defining a position and dimension of a respective moving object in the previous image;
    generating a temporally filtered set of flow data by determining which motion vectors in the set of flow data have a position within at least one of the boundary boxes, and including the determined motion vectors are in the temporally filtered set of flow data;
    calculating for each motion vector in the temporally filtered set of flow data, a respective first moto-compensated vector as a function of the refined parameters of the global motion model; and
    grouping the respective first moto-compensated vectors as a function of a position, a length and/or an orientation of the respective first moto-compensated vectors, and determining a boundary box list for a current image by determining a respective boundary box for each group of the respective first moto-compensated vectors.

2. The method according to claim 1, wherein refined parameters of the global motion model comprise:
    a horizontal movement of a background image due to a movement of the image sensor,
    a vertical movement of the background image due to the movement of the image sensor,
    a rotation of the background image due to the movement of the image sensor; and
    a zoom of the background image due to the movement of the image sensor.

3. The method according to claim 1, wherein the global motion model is determined by performing a Random Sample Consensus (RANSAC).

4. The method according to claim 1, further comprising:
    calculating for each motion vector in the outlier set, a respective second moto-compensated vector as a function of the refined parameters; and
    before generating the temporally filtered set of flow data, removing motion vectors from the outlier set similar to the respective second moto-compensated vector to produce a refined set of flow data, wherein the temporally filtered set of flow data is generated from the refined set of flow data.

5. The method according claim 1, further comprising pre-processing the motion vectors in the set of flow data, wherein the pre-processing comprises at least one of:
    removing out-of-range motion vectors;
    removing out-of-frame motion vectors; or
    eliminating noisy motion vectors.

6. The method according claim 1, further comprising post-processing the moto-compensated vectors, wherein the post-processing comprises at least one of:
    removing out-of-range moto-compensated vectors;
    removing out-of-frame moto-compensated vectors; or
    eliminating noisy moto-compensated vectors.

7. The method of claim 1, wherein generating the set of flow data comprises using image data from only two consecutive frames.

8. A non-transitory machine readable medium having stored thereon a program having a program code for performing the method of claim 1, when the program is executed on at least one processor.

9. The method according to claim 1, comprising determining an area occupied by the motion vectors in the set of flow data and an area occupied by the motion vectors in the temporally filtered set of flow data, and setting the boundary box list to empty when the area occupied by the motion vectors in the temporally filtered set of flow data is greater than a given percentage of the area occupied by the motion vectors in the set of flow data.

10. The method according to claim 9, further comprising determining a number of motion vectors in the set of flow data and a number of motion vectors in the temporally filtered set of flow data, and setting the boundary box list to empty when the number motion vectors in the temporally filtered set of flow data is greater than a given percentage of the number of motion vectors in the set of flow data.

11. A system comprising:
    a processor configured for:
        determining flow data from a sequence of images,
        decomposing the flow data into global motion related motion vectors and local object related motion vectors,
        calculating global motion parameters from the global motion related motion vectors,
        compensating the local object related motion vectors using the calculated global motion parameters, and
        clustering the compensated local object related motion vectors to generate a list of detected moving objects.

12. The system of claim 11, wherein the processor is further configured for:
    determining, for each image of the sequence of images, which local object related motion vectors are associated with detected moving objects on the list of detected moving objects associated with a previous image of the sequence of images; and before compensating the local object related motion vectors, preserving the local object related motion vectors are associated with the detected moving objects on the list of detected moving objects associated with the previous image of the sequence of images.

13. The system of claim 12, wherein;

the list of detected moving objects comprises a bounding box list; and determining which local object related motion vectors are associated with detected moving objects on the list of detected moving objects associated with a previous image of the sequence of images comprising determining which local object related motion vectors are within bounding boxes associated with the previous image of the sequence of images.

14. The system of claim 11, wherein the processor is configured to receive the sequence of images generated from an image sensor attached to a moving device.

15. The system of claim 14, further comprising the image sensor attached to the moving device.

16. The system of claim 15, wherein:

the image sensor comprises a camera; and the moving device is an aerial vehicle.

17. An image signal processor comprising:

a hardware image processing core configured to perform flow analysis; and a processor programmed to perform the following steps:
causing the hardware image processing core to determine flow data from a sequence of images;
producing a global motion model and an outlier set of motion vectors related to local object motion of the sequence of images;
motion compensating the outlier set of motion vectors based on the global motion model to produce compensated motion vectors; and
determining a list of moving objects from the compensated motion vectors.

18. The image signal processor of claim 17, wherein the processor is further programmed to:

before motion compensating the outlier set of motion vectors:
for a present image of the sequence of images, determine which motion vectors within the outlier set of motion vectors are associated with a moving object on the list of moving objects associated with a previous image of the sequence of images, and
preserve the motion vectors within the outlier set of motion vectors determined to be associated with the moving object on the list of moving objects associated with a previous image of the sequence of images.

19. The image signal processor of claim 17, wherein the sequence of images is generated by a moving camera.

20. The image signal processor of claim 17, wherein the processor is configured to cause the hardware image processing core to determine the flow data from only two consecutive images.

21. The image signal processor of claim 17, wherein the processor is further programmed to motion compensate the outlier set of motion vectors by:

generating an inlier set of motion vectors related to global motion of the sequence of images; and determining refined global motion parameters based on the inlier set of motion vectors, wherein motion compensating the outlier set of motion vectors based on the global motion model comprises compensating the outlier set of motion vectors based on the refined global motion parameters.

22. The image signal processor of claim 21, wherein the processor is further programmed to remove motion vectors from the outlier set of motion vectors that are similar to the compensated motion vectors.

23. A method of detecting moving objects, the method comprising:

receiving a sequence of images generated by a moving image sensor;

determining flow data from the sequence of images;

decomposing the flow data into global motion related motion vectors and local object related motion vectors;

calculating global motion parameters from the global motion related motion vectors;

compensating the local object related motion vectors using the calculated global motion parameters; and clustering the compensated local object related motion vectors to generate a list of detected moving objects.

24. The method of claim 23, further comprising:

determining, for each image of the sequence of images, which local object related motion vectors are associated with detected moving objects on the list of detected moving objects associated with a previous image of the sequence of images; and before compensating the local object related motion vectors, preserving the local object related motion vectors are associated with the detected moving objects on the list of detected moving objects associated with the previous image of the sequence of images.

* * * * *